(12) United States Patent
Kaji et al.

(10) Patent No.: US 9,764,645 B2
(45) Date of Patent: Sep. 19, 2017

(54) ELECTRIC VEHICLE

(71) Applicant: TOYOTA JIDOSHA KABUSHIKI KAISHA, Toyota-shi, Aichi-ken (JP)

(72) Inventors: Masaya Kaji, Toyota (JP); Tomoko Oba, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/135,784

(22) Filed: Apr. 22, 2016

(65) Prior Publication Data

US 2016/0311324 A1  Oct. 27, 2016

(30) Foreign Application Priority Data

Apr. 23, 2015 (JP) .................................. 2015-088266

(51) Int. Cl.
*B60L 3/00* (2006.01)

(52) U.S. Cl.
CPC ........... *B60L 3/003* (2013.01); *B60L 2240/12* (2013.01); *B60L 2240/36* (2013.01); *B60L 2240/421* (2013.01); *B60L 2270/00* (2013.01)

(58) Field of Classification Search
CPC ............... B60L 3/003; B60L 2270/00; B60L 2240/421; B60L 2240/36; B60L 2240/12

USPC ........... 701/22; 363/56.01; 165/104.33, 271; 165/200; 361/699
See application file for complete search history.

(56) References Cited

U.S. PATENT DOCUMENTS

| | | | |
|---|---|---|---|
| 2010/0296247 A1* | 11/2010 | Chang | H05K 7/20927 361/699 |
| 2012/0168140 A1* | 7/2012 | Yokkoyama | B60L 1/003 165/271 |
| 2013/0343105 A1 | 12/2013 | Kosugi | |

FOREIGN PATENT DOCUMENTS

| | | |
|---|---|---|
| JP | 2005-45927 | 2/2005 |
| JP | 2006-050870 A | 2/2006 |
| JP | 2009-171766 A | 7/2009 |
| JP | 2011-88549 | 5/2011 |
| WO | WO 2012/124073 A1 | 9/2012 |

* cited by examiner

*Primary Examiner* — Marthe Marc-Coleman
(74) *Attorney, Agent, or Firm* — Finnegan, Henderson, Farabow, Garrett & Dunner, LLP

(57) ABSTRACT

An electric vehicle includes a motor, an inverter, a battery, a cooler configured to cool the inverter, and an electronic control unit. The electronic control unit is configured to execute following when abnormality occurs to the cooler: i) set a vehicle speed, at which an induced voltage by the motor becomes at most equal to an input voltage that is input to the inverter from the battery side, as vehicle speed limit, and ii) control the motor such that the electric vehicle travels within a range of the vehicle speed limit.

5 Claims, 5 Drawing Sheets

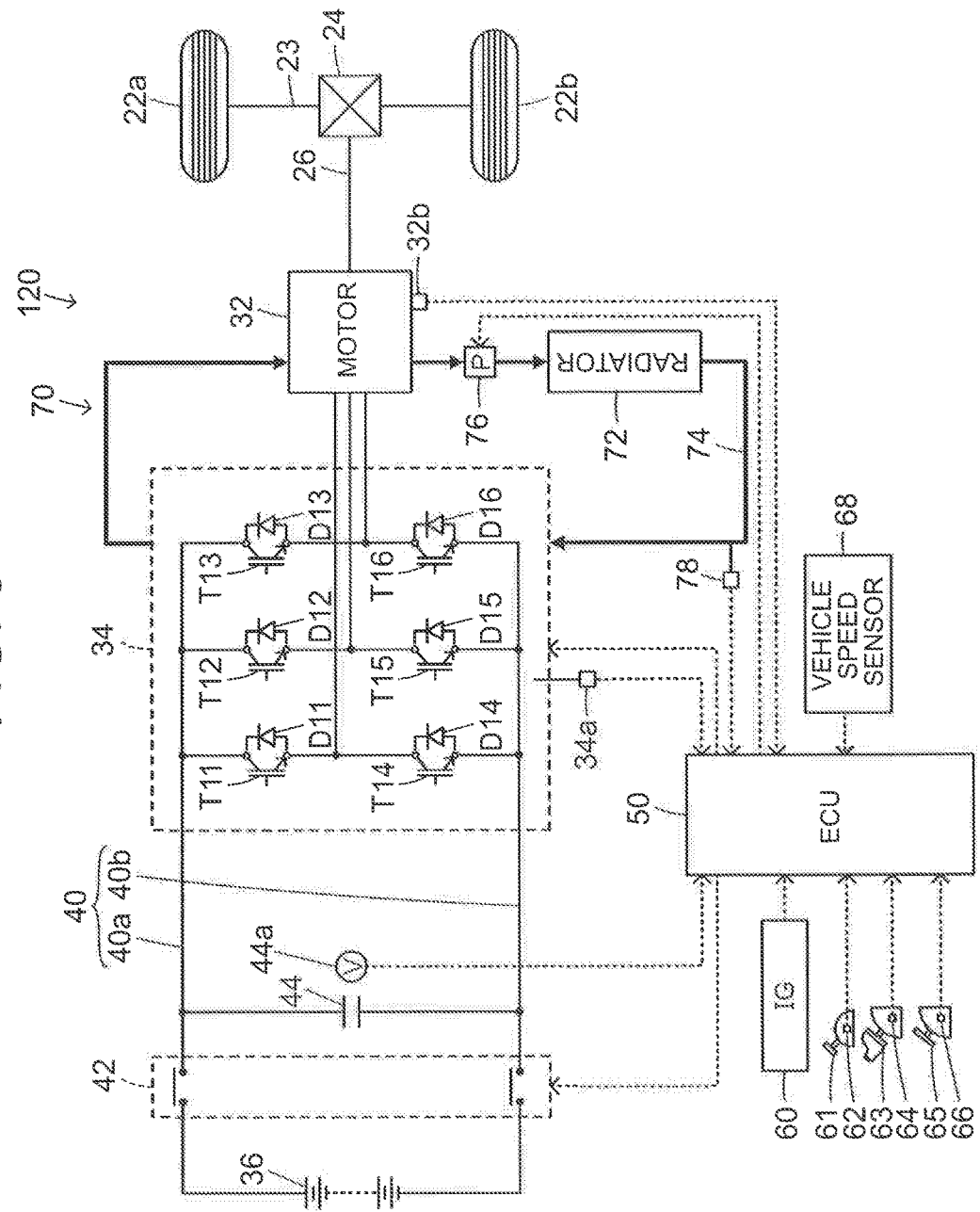

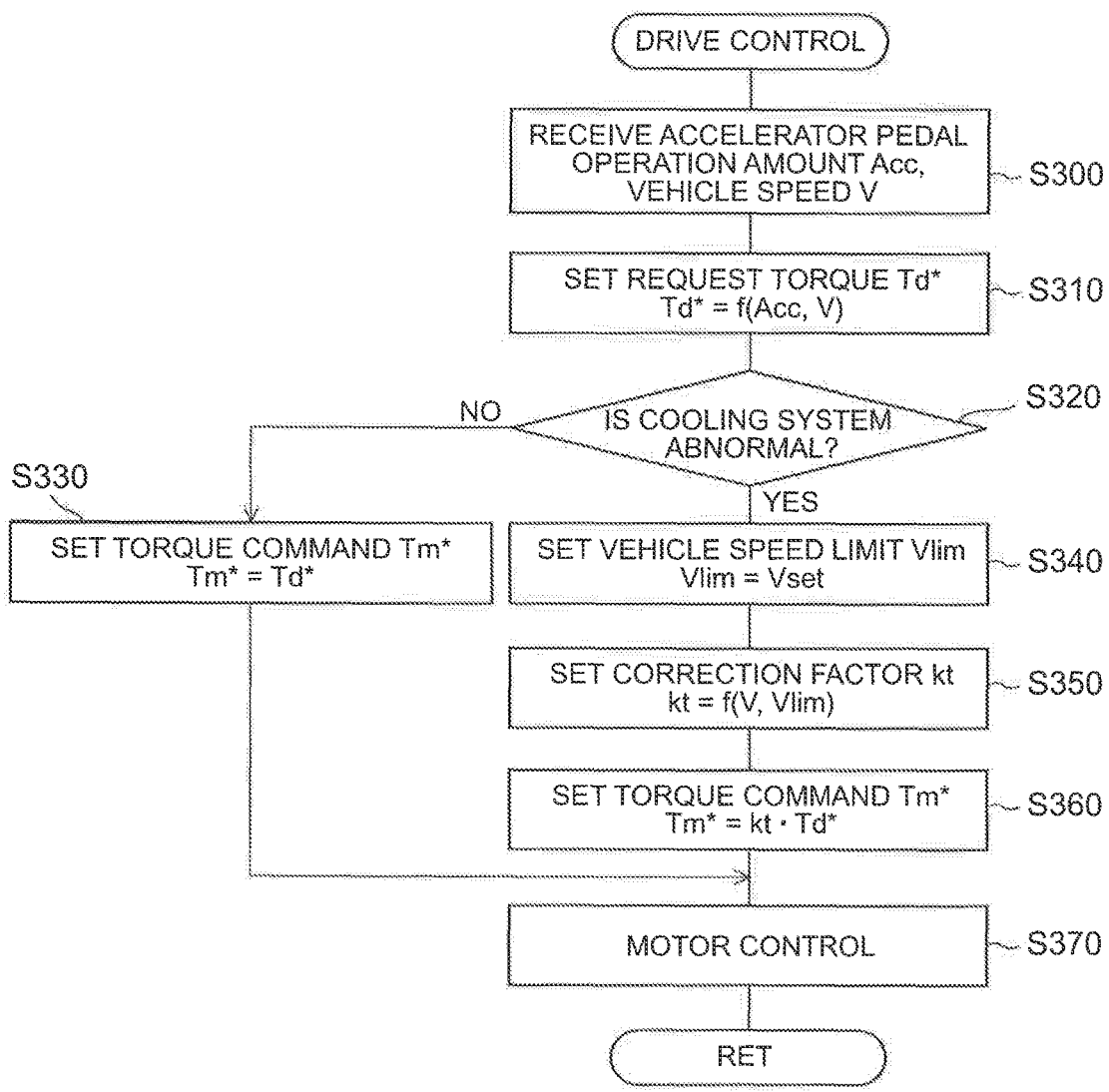

ELECTRIC VEHICLE

INCORPORATION BY REFERENCE

The disclosure of Japanese Patent Application No. 2015-088266 filed on Apr. 23, 2015 including the specification, drawings and abstract is incorporated herein by reference in its entirety.

BACKGROUND

1. Field

The disclosure relates to an electric vehicle and, in particular, to an electric vehicle that includes a motor for traveling, an inverter that drives this motor, and a cooler that cools the inverter.

2. Description of Related Art

As an electric vehicle of this type, an electric vehicle that limits a load factor of a motor at a time when an element temperature of an inverter that drives the motor exceeds a threshold has conventionally been suggested (for example, see International Publication No. 2012/124073). In this electric vehicle, the threshold at a time when limitation is applied to the load factor of the motor is changed by using a temperature of a cooling liquid of a cooler that cools the inverter, a DC voltage applied to the inverter, a carrier frequency, and the like as parameters. In this way, performance of the inverter can sufficiently be exhibited.

In the above-described electric vehicle, the load factor of the motor is limited. However, depending on a rotational speed of the motor, there is a case where a current flows through the inverter and the element temperature of the inverter is increased. When the motor rotates at a relatively high rotational speed, an induced voltage generated by the motor (also referred to as a counter-electromotive voltage) becomes higher than the DC voltage input to the inverter. Thus, field-weakening control is typically executed. When the field-weakening control is executed, the current flows through the inverter, and the element temperature of the inverter is increased. In particular, when abnormality occurs to the cooler that cools the inverter, the element temperature of the inverter is abruptly increased. Thus, the limitation of the load factor of the motor is not sufficient enough to prevent overheating of the inverter.

SUMMARY

This specification provides an electric vehicle that suppresses overheating of an element of an inverter at a time when abnormality occurs to a cooler that cools the inverter.

The electric vehicle of the present specification includes: a motor that receives/outputs power for traveling; an inverter that drives the motor; a battery connected to the inverter; and a cooler that cools the inverter. The electric vehicle of the present specification is characterized by including an electronic control unit that sets a vehicle speed, at which an induced voltage by the motor becomes at most equal to an input voltage that is input to the inverter from the battery side, as a vehicle speed limit and controls the motor such that the electric vehicle travels within a range of the vehicle speed limit when abnormality occurs to the cooler.

In the electric vehicle of the present specification, when the abnormality occurs to the cooler that cools the inverter, the vehicle speed, at which the induced voltage (a counter-electromotive voltage) by the motor that receives/outputs the power for traveling becomes at most equal to the input voltage that is input to the inverter from the battery side, is set as the vehicle speed limit, and the motor is controlled such that the electric vehicle travels within the range of the vehicle speed limit. In this way, because the induced voltage (the counter-electromotive voltage) that is generated by the motor becomes higher than the input voltage of the inverter, field-weakening control is executed, and it is thus possible to suppress an increase in an element temperature of the inverter, which is caused by a flow of a current through the inverter. As a result, it is possible to suppress overheating of the element of the inverter.

In such an electric vehicle of the present specification, the electronic control unit may be configured to set the vehicle speed, at which the motor generates the induced voltage corresponding to the input voltage, as the vehicle speed limit. In addition, the electronic control unit may be configured to set a vehicle speed, at which the abnormality occurs to the cooler, as the vehicle speed limit in the case where the induced voltage at a time when the abnormality occurs to the cooler is at most equal to the input voltage. At either one of these vehicle speed limits, the induced voltage (the counter-electromotive voltage) by the motor does not exceed the input voltage of the inverter. Thus, a temperature increase of the element of the inverter, which is associated with execution of the field-weakening control, can be prevented.

The electric vehicle of the present specification may further include a converter that is attached between the battery and the inverter. The converter is configured to be able to boost power on the battery side and supply the power to the inverter side, and is also configured to be able to step down the power on the inverter side and supply the power to the battery side. The electronic control unit may be configured to control the converter such that the input voltage is maintained and to set a vehicle speed, at which the motor generates the induced voltage corresponding to a first voltage that is at most equal to the input voltage, as the vehicle speed limit in the case where the induced voltage at the time when the abnormality occurs to the cooler is at most equal to the input voltage. In this way, the induced voltage (the counter-electromotive voltage) by the motor does not exceed the input voltage of the inverter. Thus, the temperature increase of the element of the inverter, which is associated with the execution of the field-weakening control, can be prevented. In this case, the electronic control unit may be configured to control the converter such that the input voltage becomes a second voltage that is at least equal to the induced voltage and to set a vehicle speed, at which the motor generates the induced voltage corresponding to the second voltage, as the vehicle speed limit in the case where the induced voltage at the time when the abnormality occurs to the cooler is higher than the input voltage. In this way, because the input voltage of the inverter is promptly made higher than the induced voltage (the counter-electromotive voltage), the field-weakening control can promptly be terminated. In addition, after the input voltage of the inverter becomes the second voltage, the induced voltage (the counter-electromotive voltage) by the motor does not exceed the input voltage of the inverter. Thus, the temperature increase of the element of the inverter, which is associated with the execution of the field-weakening control, can be prevented.

BRIEF DESCRIPTION OF THE DRAWINGS

Features, advantages, and technical and industrial significance of exemplary embodiments of the present specification will be described below with reference to the accompanying drawings, in which like numerals denote like elements, and wherein:

FIG. 5 is a configuration diagram that schematically shows a configuration of an electric car 120 of a second embodiment of the present specification; and FIG. 6 is a flowchart that shows another example of the drive control executed by the ECU 50.

DETAILED DESCRIPTION OF EMBODIMENTS

Next, a mode for carrying out the present specification will be described by using embodiments.

Figure 1:
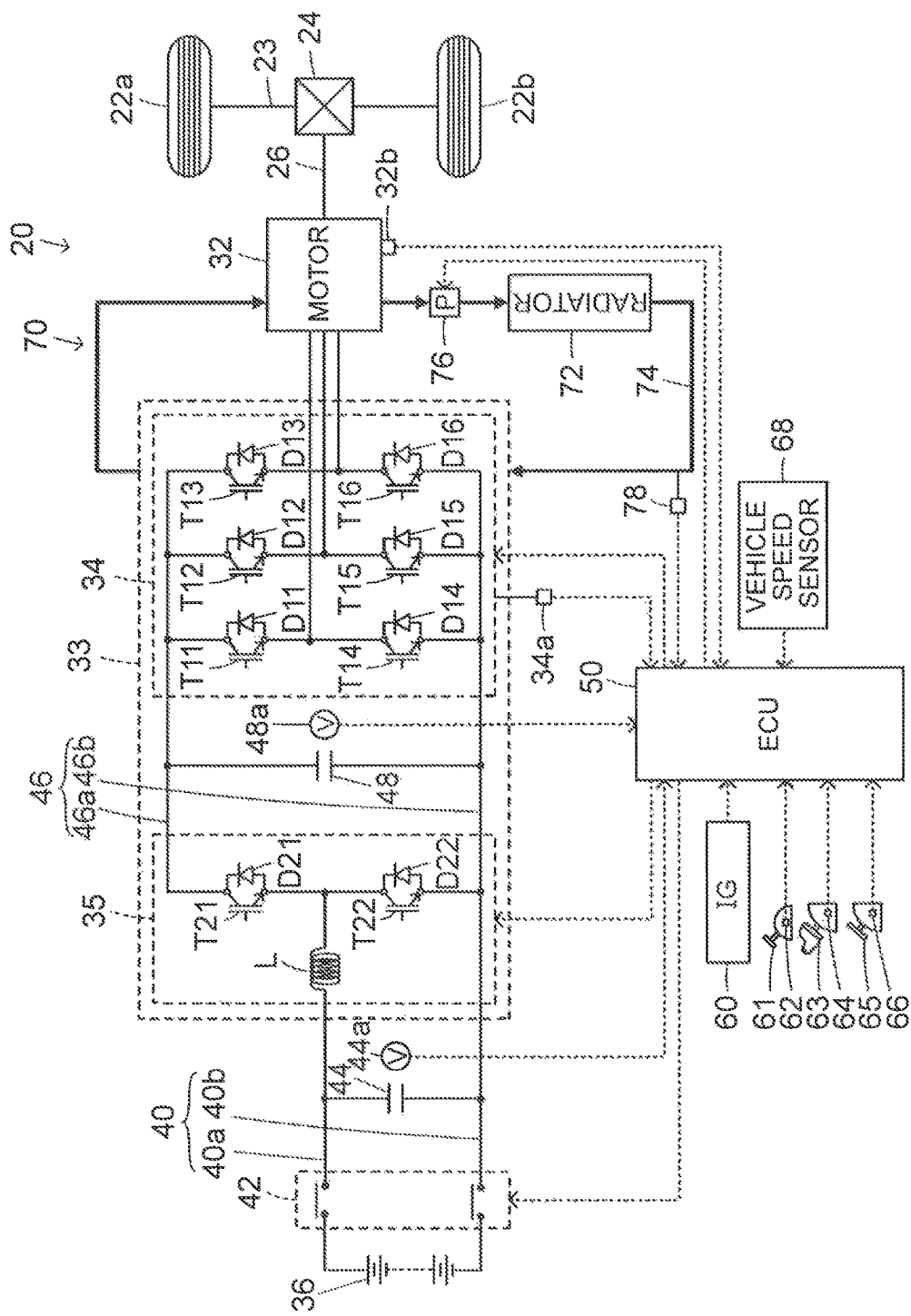
FIG. 1 is a configuration diagram that schematically shows a configuration of an electric car 20 of a first embodiment of the present specification.

FIG. 1 is a configuration diagram that schematically shows a configuration of an electric car 20 of a first embodiment of the present specification. As shown in the drawing, the electric car 20 of the first embodiment includes a motor 32, a power control unit (hereinafter referred to as a PCU) 33, a battery 36, a relay 42, a cooler 70, and an electronic control unit (hereinafter referred to as an ECU) 50.

The motor 32 is configured as a well-known synchronous generator motor that has: a rotor having a permanent magnet therein; and a stator around which a three-phase coil is wound. The motor 32 is attached to a drive shaft 26 that is coupled to drive wheels 22a, 22b via a drive shaft (an axle) 23 and a differential gear 24. This motor 32 generates a counter-electromotive voltage (also referred to as an induced voltage) Vm when rotating.

The PCU 33 includes an inverter 34, a booster converter 35, and a smoothing capacitor 48 and accommodates these in a single case. The inverter 34 has six transistors T11 to T16 and six diodes D11 to D16. Two pieces among the transistors T11 to T16 are arranged as a pair such that each of a collector and an emitter of the pair is connected to a positive electrode bus bar 46a and a negative electrode bus bar 46b of a high-voltage system power line 46 respectively. The six diodes D11 to D16 are respectively connected in parallel with the transistors T11 to T16. Each of a cathode and an anode of the diode is connected to the collector and the emitter of the transistor respectively. Coils of the three-phase coil (a U-phase, a V-phase, and a W-phase) of the motor 32 are respectively connected to connection points between the paired transistors of the transistors T11 to T16. Accordingly, when the voltage is applied to the inverter 34, a ratio of ON times of the pairs among the transistors T11 to T16 is adjusted by the ECU 50. Consequently, a rotating magnetic field is formed in the three-phase coil, and the motor 32 is rotationally driven.

The booster converter 35 is connected to the high-voltage system power line 46, to which the inverter 34 is connected, and a low-voltage system power line 40, to which the battery 36 is connected. This booster converter 35 has two transistors T21, T22, two diodes D21, D22 that are connected in parallel in reverse directions of the transistors T21, T22; and a reactor L. The transistor T21 is connected to the positive electrode bus bar 46a of the high-voltage system power line 46. The transistor T22 is connected to the transistor T21 and is also connected to a negative electrode bus bar 40b of the low-voltage system power line 40 that also serves as the negative electrode bus bar 46b of the high-voltage system power line 46. The reactor L is connected to a connection point between the transistors T21, T22 and a positive electrode bus bar 40a of the low-voltage system power line 40. When the transistors T21, T22 are turned ON or OFF by the ECU 50, the booster converter 35 boosts power of the low-voltage system power line 40 and supplies the power to the high-voltage system power line 46, or steps down power of the high-voltage system power line 46 and supplies the power to the low-voltage system power line 40.

The battery 36 is constructed as, for example, a lithium-ion secondary battery or a nickel hydrogen secondary battery. A capacitor 44 is connected to the positive electrode bus bar 40a and the negative electrode bus bar 40b of the low-voltage system power line 40. The relay 42 is provided on the battery 36 side from connection points of the positive electrode bus bar 40a and the negative electrode bus bar 40b with the capacitor 44. This relay 42 connects or disconnects between the PCU 33 side (the booster converter 35 and the inverter 34) and the battery 36 side.

The cooler 70 includes a radiator 72, a circulation channel 74, and an electric pump 76. The radiator 72 exchanges heat between a coolant (a long life coolant (an LLC)) and external air. The circulation channel 74 is a channel for circulating the coolant through the radiator 72, the inverter 34, and the motor 32. The electric pump 76 pressure-feeds the coolant.

Although not shown, the ECU 50 is configured as a microprocessor that has a CPU as a central component, and includes, in addition to the CPU, a ROM that stores a processing program, a RAM that temporarily stores data, input/output ports, and a communication port. The ECU 50 receives signals from various sensors via the input port. Following can be raised as the signals from the various sensors: • a rotation position θm from a rotation position detection sensor 32b that detects a rotation position of the rotor of the motor 32, • phase currents Iu, Iv, Iw of the phases of the motor 32 from a current sensor that is attached to a power line for connecting the motor 32 and the inverter 34, • an inverter temperature Tinv from a temperature sensor 34a that detects a temperature of the inverter 34, • a battery voltage Vb from a voltage sensor that is attached between terminals of the battery 36, • a battery current Ib from a current sensor that is attached to the output terminal of the battery 36, • a battery temperature Tb from a temperature sensor that is attached to the battery 36, • a capacitor voltage (a low-voltage system voltage) VB from a voltage sensor 44a that is attached between terminals of the capacitor 44, • a capacitor voltage (a high-voltage system voltage) VH from a voltage sensor 48a that is attached between terminals of the capacitor 48, • a coolant temperature Tw from a temperature sensor 78 that is attached to the circulation channel 74 of the cooler 70, • an ignition signal from an ignition switch 60, • a shift position SP from a shift position sensor 62 that detects an operation position of a shift lever 61, • an accelerator pedal operation amount Acc from an accelerator pedal position sensor 64 that detects a depression amount of an accelerator pedal 63, • a brake pedal position BP from a brake pedal position sensor 66 that detects a depression amount of a brake pedal 65, and • a vehicle speed V from a vehicle speed sensor 68.

The ECU 50 outputs various control signals via the output port. Following can be raised as the various control signals: • a switching control signal for the transistors T11 to T16 of the inverter 34, • a switching control signal for the transistors T21, T22 of the booster converter 35, • a control signal for the relay 42, and • a control signal for the electric pump 76 of the cooler 70.

The ECU 50 computes a rotational speed Nm of the motor 32 on the basis of the rotation position θm of the rotor of the motor 32 that is detected by the rotation position detection sensor 32*b*. The ECU 50 also computes a state of charge SOC of the battery 36 on the basis of an integrated value of the battery current Ib that is detected by the current sensor.

Figure 2:
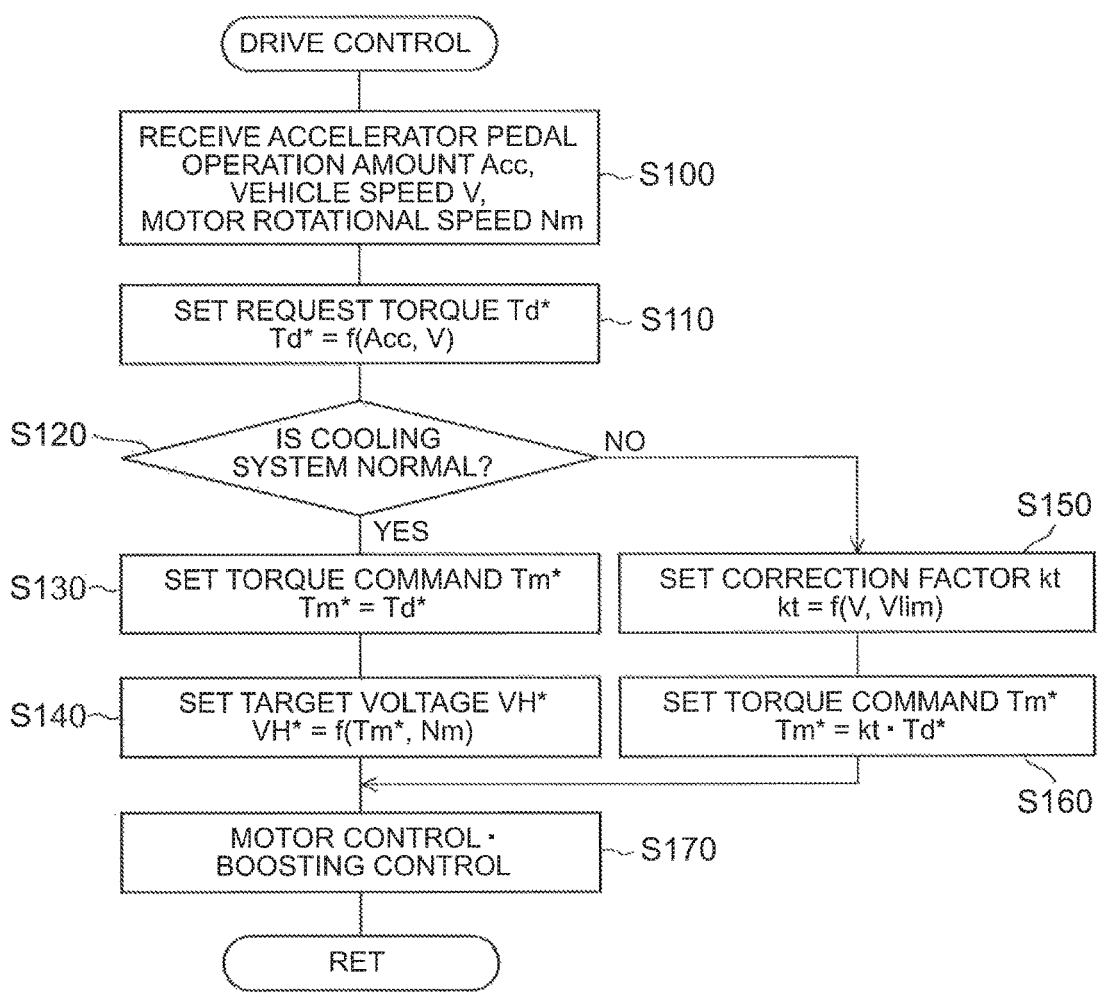
FIG. 2 is a flowchart that shows one example of drive control executed by an ECU 50.
Figure 3:
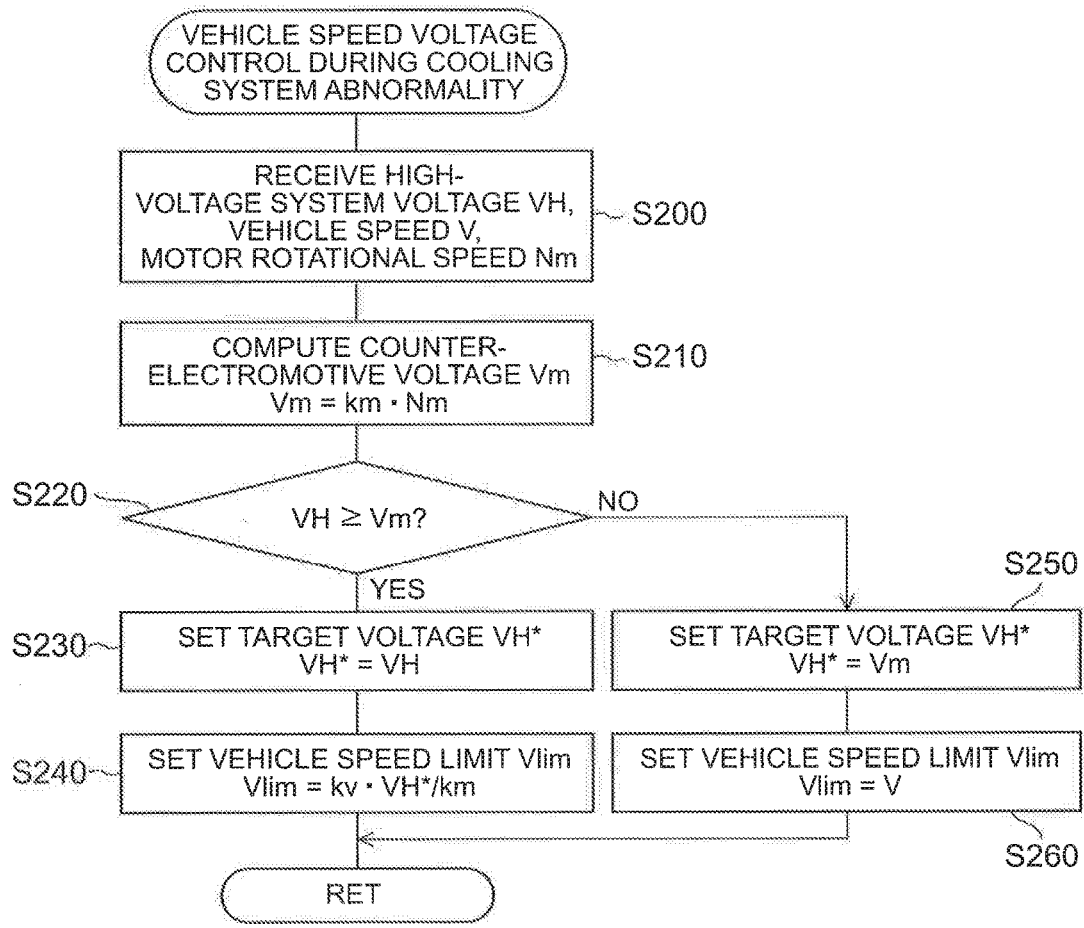
FIG. 3 is a flowchart that shows one example of vehicle speed voltage control during cooling system abnormality executed by the ECU 50.

Next, a description will be made on an operation of the electric car 20 of the first embodiment that is configured as described above, particularly, an operation thereof at a time when abnormality occurs to the cooler 70. FIG. 2 is a flowchart that shows one example of drive control repeatedly executed by the ECU 50 at specified intervals regardless of presence or absence of the abnormality of the cooler 70, and FIG. 3 is a flowchart that shows one example of vehicle speed voltage control during cooling system abnormality executed by the ECU 50 at a time when the abnormality occurs to the cooler 70. First, the drive control at a time when the cooler 70 is normal will briefly be described, and then, the drive control at the time when the abnormality occurs to the cooler 70 will be described. Noted that, as the abnormality of the cooler 70, states where cooling cannot be performed due to failure of the electric pump 76, failure of the radiator 72, leakage of the coolant, and the like can be considered.

When the cooler 70 is normal, as shown in FIG. 2, the ECU 50 first receives the accelerator pedal operation amount Acc from the accelerator pedal position sensor 64, the vehicle speed V from the vehicle speed sensor 68, and the rotational speed Nm of the motor 32 (step S100), and sets request torque Td* that is requested to the drive shaft 26 on the basis of the accelerator pedal operation amount Acc and the vehicle speed V (step S110). Next, the ECU 50 determines whether the cooler 70 is normal (step S120). If the ECU 50 confirms that the cooler 70 is normal, the ECU 50 sets the request torque Td* as a torque command Tm* of the motor 32 (step S130), and sets a target voltage VH* on the basis of the torque command Tm* and the rotational speed Nm of the motor 32 (step S140). Then, the ECU 50 executes motor control in which the six transistors T11 to T16 of the inverter 34 are subjected to switching control such that torque corresponding to the torque command Tm* is output from the motor 32, also executes boosting control in which the transistors T21, T22 of the booster converter 35 are subjected to the switching control such that the voltage VH of the high-voltage system power line 46 becomes the target voltage VH* (step S170), and then terminates the drive control. When written as "corresponding to predetermined torque or voltage", it means that it is equal or substantially equal to the predetermined torque or voltage.

Next, the time when the abnormality occurs to the cooler 70 will be described. For convenience of the description, setting of the target voltage VH* and a vehicle speed limit Vlim will first be described by using FIG. 3. Thereafter, the drive control at the time when the abnormality occurs to the cooler 70 will be described by using FIG. 2. When the vehicle speed voltage control during the cooling system abnormality in FIG. 3 is executed, the ECU 50 first receives the high-voltage system voltage VH from the voltage sensor 48*a*, the rotational speed Nm of the motor 32, and the vehicle speed V from the vehicle speed sensor 68 (step S200), and computes the counter-electromotive voltage Vm (Vm=km·Nm) of the motor 32 by multiplying the rotational speed Nm by a conversion factor km (step S210). Next, the ECU 50 compares the high-voltage system voltage VH and the counter-electromotive voltage Vm (step S220).

Figure 4:
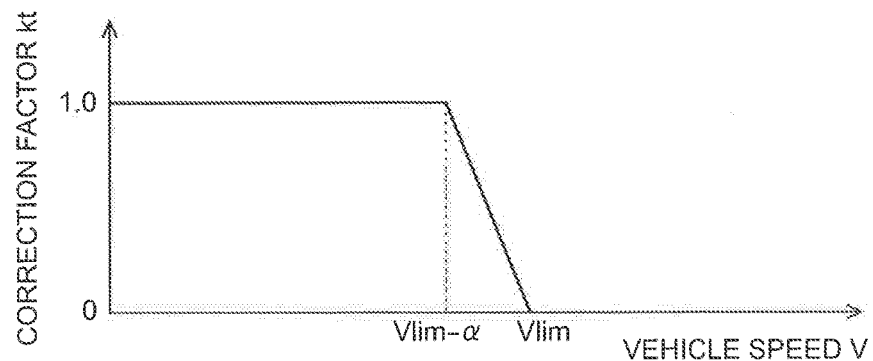
FIG. 4 is an explanatory chart that shows one example of a situation where a correction factor kt is set.

If it is determined in step S220 that the high-voltage system voltage VH is at least equal to the counter-electromotive voltage Vm, the ECU 50 sets the high--voltage system voltage VH as the target voltage VH* (step S230). Then, the ECU 50 obtains a value by dividing the target voltage VH* by the conversion factor km, multiplies the value by a factor kv for converting the rotational speed to the vehicle speed, and sets the multiplied value as the vehicle speed limit Vlim (step S240). Thereafter, the ECU 50 terminates this control. That is, if the high-voltage system voltage VH is at least equal to the counter-electromotive voltage Vm at the time when the abnormality occurs to the cooler 70, the high-voltage system voltage VH at the time is set as the target voltage VH*, and the vehicle speed at which the motor 32 generates the counter-electromotive voltage (the induced voltage) corresponding to the high-voltage system voltage VH at the time is set as the vehicle speed limit Vlim. In the drive control in FIG. 2, if it is determined in step S120 that the abnormality occurs to the cooler 70, the ECU 50 sets a correction factor kt on the basis of the vehicle speed V and the vehicle speed limit Vlim (step S150), and sets a value obtained by multiplying the request torque Td* by the correction factor kt as the torque command Tm* of the motor 32 (step S160). Then, the ECU 50 executes the motor control and the boosting control (step 5170) and terminates the drive control. FIG. 4 shows one example of a situation where the correction factor kt is set. In the example of FIG. 4, the correction factor kt is set at 1.0 from the vehicle speed of a value 0 to the vehicle speed (Vlim-α) near the vehicle speed limit Vlim, and is set to become a value 0 from 1.0 from the vehicle speed (Vlim-α) to the vehicle speed limit Vlim. Accordingly, for the torque command Tm* of the motor 32, the request torque Td* is set until the vehicle speed (Vlim-α), a gradually smaller value is set from the vehicle speed (Vlim-α) and higher, and a value 0 is set from the vehicle speed limit Vlim and higher. Thus, the vehicle travels at the vehicle speed up to the vehicle speed limit Vlim. As a result, because the counter-electromotive voltage Vm of the motor 32 is higher than the high-voltage system voltage VH, field-weakening control is executed. Thus, it is possible to suppress overheating of an element of the inverter 34, which is caused by a flow of the current through the element. Noted that 10 km/h, 20 km/h, or the like can be used for "α" in the vehicle speed (Vlim-α).

If it is determined in step S220 in FIG. 3 that the counter-electromotive voltage Vm is higher than the high-voltage system voltage VH, the ECU 50 sets the computed counter-electromotive voltage Vm as the target voltage VH* (step S250), sets the vehicle speed V as the vehicle speed limit Vlim (step S260), and terminates this control. That is, if the counter-electromotive voltage Vm is higher than the high-voltage system voltage VH at the time when the abnormality occurs to the cooler 70, the counter-electromotive voltage Vm at the time is set as the target voltage VH*, and the vehicle speed V at the time is set as the vehicle speed limit Vlim. In the drive control of FIG. 2, as described above, if it is determined in step S120 that the abnormality occurs to the cooler 70, the torque command Tm* of the motor 32 is set by multiplying the request torque Td* by the correction factor kt that is based on the vehicle speed V and the vehicle speed limit Vlim (steps S150, S160), and the motor control and the boosting control are executed (step S170). Accordingly, while the high-voltage system voltage VH is promptly increased to the target voltage VH*, that is, to the counter-electromotive voltage Vm at the time when the abnormality occurs to the cooler 70, the vehicle speed V is reduced by the vehicle speed limit Vlim. Thus, the field-weakening control is executed for a short time because the counter-electromotive voltage Vm is higher than the high-voltage system voltage VH. Thereafter, because the high-voltage system voltage VH becomes at least equal to the counter-electromotive voltage Vm, the field-weakening control is not executed. As a result, the field-weakening control is executed because the counter-electromotive voltage Vm of the motor 32 is higher than the high-voltage system voltage VH. In this way, it is possible to suppress overheating of the element of the inverter 34, which is caused by the flow of the current through the element.

In the electric car 20 of the first embodiment that has been described so far, in the case where the high-voltage system voltage VH that is input to the inverter 34 at the time when the abnormality occurs to the cooler 70 is at least equal to the counter-electromotive voltage Vm, the high-voltage system voltage VH at the time is set as the target voltage VH*, and the boosting control is executed. Then, the vehicle speed at which the counter-electromotive voltage (the induced voltage) corresponding to the target voltage VH* set by the motor 32 is generated is set as the vehicle speed limit Vlim, and the motor 32 is subjected to the drive control such that the vehicle speed V becomes at most equal to the vehicle speed limit Vlim. Accordingly, the field-weakening control is executed because the counter-electromotive voltage Vm of the motor 32 is higher than the high-voltage system voltage VH. Thus, it is possible to suppress overheating of the element of the inverter 34, which is caused by the flow of the current through the element. In the case where the counter-electromotive voltage Vm at the time when the abnormality occurs to the cooler 70 is higher than the high-voltage system voltage VH that is input to the inverter 34, the counter-electromotive voltage Vm at the time is set as the target voltage VH*, and the boosting control is executed. In addition, the vehicle speed V at the time is set as the vehicle speed limit Vlim, and the motor 32 is subjected to the drive control such that the vehicle speed V becomes at most equal to the vehicle speed limit Vlim. Accordingly, the field-weakening control is executed because the counter-electromotive voltage Vm of the motor 32 is higher than the high-voltage system voltage VH. Thus, it is possible to suppress overheating of the element of the inverter 34, which is caused by the flow of the current through the element. When the above two states are rephrased, the vehicle speed at which the counter-electromotive voltage Vm of the motor 32 becomes at most equal to the high-voltage system voltage VH input to the inverter 34 is set as the vehicle speed limit Vlim at the time when the abnormality occurs to the cooler 70, and the motor 32 is subjected to the drive control such that the vehicle speed V becomes at most equal to the vehicle speed limit Vlim. It is possible to suppress overheating of the element of the inverter 34 by controlling just as described.

In the electric car 20 of the first embodiment, in the case where the high-voltage system voltage VH that is input to the inverter 34 at the time when the abnormality occurs to the cooler 70 is at least equal to the counter-electromotive voltage Vm, the high-voltage system voltage VH at the time is set as the target voltage VH*, and the vehicle speed at which the counter-electromotive voltage (the induced voltage) corresponding to the set target voltage VH* is generated is set as the vehicle speed limit Vlim. However, the counter-electromotive voltage Vm of the motor 32 only has to become at most equal to the high-voltage system voltage VH that is input to the inverter 34. Accordingly, the high-voltage system voltage VH at the time may be set as the target voltage VH* and the vehicle speed V at the time may be set as the vehicle speed limit Vlim. In addition, the counter-electromotive voltage Vm at the time may be set as the target voltage VH*, and the vehicle speed V at the time may be set as the vehicle speed limit Vlim.

In addition, in the electric car 20 of the first embodiment, in the case where the counter-electromotive voltage Vm is higher than the high-voltage system voltage VH that is input to the inverter 34 at the time when the abnormality occurs to the cooler 70, the counter-electromotive voltage Vm at the time is set as the target voltage VH*, and the vehicle speed V at the time is set as the vehicle speed limit Vlim. However, the counter-electromotive voltage Vm of the motor 32 only has to become at most equal to the high-voltage system voltage VH that is input to the inverter 34. Accordingly, a voltage that is higher than the counter-electromotive voltage Vm at the time may be set as the target voltage VH*, and the vehicle speed V at the time may be set as the vehicle speed limit Vlim. In addition, a voltage that is higher than the counter-electromotive voltage Vm at the time may be set as the target voltage VH*, and the vehicle speed at which the counter-electromotive voltage Vm corresponding to the set target voltage VH* is generated may be set as the vehicle speed limit Vlim.

In the electric car 20 of the first embodiment, 1.0 is set as the correction factor kt from the vehicle speed of the value 0 to the vehicle speed (Vlim-α) near the vehicle speed limit Vlim, and the correction factor kt is set to become the value 0 from 1.0 from the vehicle speed (Vlim-α) to the vehicle speed limit Vlim. However, drive torque only has to be reduced by the vehicle speed limit Vlim. Accordingly, the correction factor kt is set at 1.0 from the vehicle speed of the value 0 to the vehicle speed (Vlim-α) near the vehicle speed limit Vlim. Then, from the vehicle speed (Vlim-α) to the vehicle speed limit Vlim, the correction factor kt may be set from 1.0 to such a value that the drive torque becomes a road load at a time when the request torque Td* is the maximum. In this way, the vehicle speed can be set to the vehicle speed limit Vlim even with the maximum request torque Td*.

FIG. 5 is a configuration diagram that schematically shows a configuration of an electric car 120 of a second embodiment of the present specification. The electric car 120 of the second embodiment has the same configuration as the electric car 20 of the first embodiment except for a point that the booster converter 35, the capacitor 48, the voltage sensor 48a are not provided. Accordingly, in order to avoid the repetitive description, of the configuration of the electric car 120 of the second embodiment, the same configuration as the configuration of the electric car 20 of the first embodiment is denoted by the same reference numerals, and the description thereon will not be made. Noted that, because the booster converter 35 is not provided in the second embodiment, a similar configuration to the low-voltage system power line 40 of the first embodiment is simply referred to as a power line 40, and the voltage VB of the capacitor 44 that is detected by the voltage sensor 44a is simply referred to as a line voltage VB.

In the electric car 120 of the second embodiment, regardless of the presence or the absence of the abnormality of the cooler 70, the drive control that is exemplified in FIG. 6 is repeatedly executed by the ECU 50 at constant intervals. Noted that, as the abnormality of the cooler 70, similar to the first embodiment, the states where cooling cannot be performed clue to failure of the electric pump 76, failure of the radiator 72, leakage of the coolant, and the like can be considered.

Once the drive control is executed, the ECU 50 first receives the accelerator pedal operation amount Acc from the accelerator pedal position sensor 64 and the vehicle speed V from the vehicle speed sensor 68 (step S300), and sets the request torque Td* that is requested to the drive shaft 26 is set on the basis of the accelerator pedal operation amount Ace and the vehicle speed V (step S310). Next, the ECU 50 determines whether the cooler 70 is normal (step S320). If the ECU 50 determines that the cooler 70 is normal, the ECU 50 sets the request torque Td* as the torque command Tm* of the motor 32 (step S330). Then, the ECU 50 executes the motor control in which the six transistors T11 to T16 of the inverter 34 are subjected to the switching control such that the torque corresponding to the torque command Tm* is output from the motor 32 (step S370), and then terminates the drive control.

If the ECU 50 determines in step S320 that the abnormality occurs to the cooler 70, the ECU 50 sets a vehicle speed Vset that is set in advance in a manner to fall within a range where the counter-electromotive voltage Vm of the motor 32 is lower than the line voltage VB as the vehicle speed limit Vlim (step S340). For example, the vehicle speed Vset, at which a lower limit voltage within a normal voltage range of the battery 36 or a slightly lower voltage than this lower limit voltage is generated as the counter-electromotive voltage Vm from the motor 32, can be set as the vehicle speed limit Vlim. Next, similar to the first embodiment, the ECU 50 sets the correction factor kt on the basis of the vehicle speed V and the vehicle speed limit Vlim by using FIG. 4 (step S350), and sets the value that is obtained by multiplying the request torque Td* by the correction factor kt as the torque command Tm* of the motor 32 (step S360). Then, the ECU 50 executes the motor control in which the six transistors T11 to T16 of the inverter 34 are subjected to the switching control such that the torque corresponding to the torque command Tm* is output from the motor 32 (step S370), and then terminates the drive control.

In such an electric car 120 of the second embodiment, when the abnormality occurs to the cooler 70, the vehicle speed that is set in advance in the manner to fall within the range where the counter-electromotive voltage Vm of the motor 32 is lower than the line voltage VB is set as the vehicle speed limit Vlim, and the motor 32 is subjected to the drive control such that the vehicle speed V becomes at most equal to the vehicle speed limit Vlim. Accordingly, because the counter-electromotive voltage Vm of the motor 32 is higher than the line voltage VB, the field-weakening control is executed. Thus, it is possible to suppress overheating of the element of the inverter 34, which is caused by the flow of the current through the element.

In the electric car 120 of the second embodiment, when the abnormality occurs to the cooler 70, the vehicle speed that is set in advance in the manner to fall within the range where the counter-electromotive voltage Vm of the motor 32 is lower than the line voltage VB is set as the vehicle speed limit Vlim. However, the counter-electromotive voltage Vm of the motor 32 only has to become at most equal to the line voltage VB. Accordingly, a vehicle speed at which the counter-electromotive voltage Vm corresponding to the line voltage VB at the time is generated may be set as the vehicle speed limit Vlim, or a vehicle speed at which the counter-electromotive voltage Vm corresponding to a voltage that is lower than the line voltage VB at the time by a specified voltage is generated may be set as the vehicle speed limit Vlim.

In the embodiment, the electric car 20 has the configuration that the motor 32 is connected to the drive shaft 26. However, for example, a configuration of an electric vehicle using wheel-in motors that are directly embedded in the drive wheels 22*a*, 22*b* may be adopted, or a configuration of a hybrid vehicle capable of traveling by the motor may be adopted.

The mode for carrying out the present specification has been described so far by using the embodiments. However, the present specification is by no means limited to these embodiments, and it is needless to say that the present specification can be implemented in various modes within the range that falls within the gist of the present specification.

The present specification can be used in a manufacturing industry of electric vehicles and the like.

Following is a summary of the embodiments. A high-voltage system voltage VH and a motor counter-electromotive voltage Vm are compared when abnormality occurs to a cooler (S220). If the high-voltage system voltage VH is at least equal to the counter-electromotive voltage Vm, the voltage VH is set as the target voltage VH*, and a vehicle speed, at which a counter-electromotive voltage of the voltage VH is generated, is set as the vehicle speed limit Vlim (S230, S240). If the voltage VH is lower than the counter-electromotive voltage Vm, the counter-electromotive voltage Vm is set as the target voltage VH*, and a vehicle speed V at the time is set as the vehicle speed limit Vlim (S250, S260). Then, voltage control is executed, and a motor is subjected to drive control such that the vehicle speed V becomes at most equal to the vehicle speed limit Vlim. In this way, field-weakening control is executed for the motor, and it is thus possible to suppress overheating of an element of an inverter, which is caused by a flow of a current through the element.

What is claimed is:

1. An electric vehicle comprising:
    a motor configured to receive power for traveling and output the power for traveling;
    an inverter configured to drive the motor;
    a battery connected to the inverter;
    a cooler configured to cool the inverter; and
    an electronic control unit configured to execute following when abnormality occurs to the cooler:
    i) set a vehicle speed, at which an induced voltage by the motor becomes at most equal to an input voltage that is input to the inverter from a battery side, as vehicle speed limit, and
    ii) control the motor such that the electric vehicle travels within a range of the vehicle speed limit.

2. The electric vehicle according to claim 1, wherein the electronic control unit is configured to set a vehicle speed, at which the motor generates the induced voltage corresponding to the input voltage, as the vehicle speed limit.

3. The electric vehicle according to claim 1, wherein the electronic control unit is configured to set a vehicle speed at a time when abnormality occurs to the cooler as the vehicle speed limit in a case where the induced voltage at the time when the abnormality occurs to the cooler is at most equal to the input voltage.

4. The electric vehicle according to claim 1 further comprising:
    a converter attached between the battery and the inverter, the converter configured to be able to boost power on the battery side and supply the power to the inverter side, and the converter configured to be able to step down the power on the inverter side and supply the power to the battery side, wherein the electronic control unit is configured to execute following in a case where the induced voltage at a time when abnormality occurs to the cooler is at most equal to the input voltage:

iii) control the converter such that the input voltage at the time when abnormality occurs to the cooler is maintained, and iv) set a vehicle speed, at which the motor generates the induced voltage corresponding to a first voltage that is at most equal to the input voltage, as the vehicle speed limit.

5. The electric vehicle according to claim 4, wherein the electronic control unit is configured to execute following in a case where the induced voltage at the time when the abnormality occurs to the cooler is higher than the input voltage:

v) control the converter such that the input voltage becomes a second voltage that is at least equal to the induced voltage, and vi) set a vehicle speed, at which the motor generates the induced voltage corresponding to the second voltage, as the vehicle speed limit.

\* \* \* \* \*